(12) United States Patent
Moore

(10) Patent No.: US 7,611,127 B1
(45) Date of Patent: Nov. 3, 2009

(54) TIRE CHANGING KIT

(76) Inventor: Dion D. Moore, 650 NE. 64th St., Apt. G205, Miami, FL (US) 33138

( * ) Notice: Subject to any disclaimer, the term of this patent is extended or adjusted under 35 U.S.C. 154(b) by 0 days.

(21) Appl. No.: 12/205,173

(22) Filed: Sep. 5, 2008

(51) Int. Cl.
*H02G 1/08* (2006.01)

(52) U.S. Cl. ............... 254/93 R; 254/122; 254/126

(58) Field of Classification Search ........... 254/93, 254/122, 124, 126, 134; 362/119; 152/416; 7/100
See application file for complete search history.

(56) References Cited

U.S. PATENT DOCUMENTS

| | | | |
|---|---|---|---|
| 1,501,719 A | | 7/1924 | Oxford et al. |
| 5,050,467 A | * | 9/1991 | Brown et al. ............... 81/466 |
| 5,657,964 A | * | 8/1997 | Yoshida ..................... 254/126 |
| 5,771,516 A | * | 6/1998 | Huang ........................... 7/100 |
| 5,876,526 A | * | 3/1999 | Hamade et al. ............. 152/416 |
| 6,773,132 B2 | * | 8/2004 | Gilligan et al. .............. 362/119 |
| D497,787 S | * | 11/2004 | Liao .............................. D8/68 |
| 2004/0125609 A1 | * | 7/2004 | Gilligan et al. ............. 362/486 |

* cited by examiner

*Primary Examiner*—Lee D Wilson
(74) *Attorney, Agent, or Firm*—Dale J. Ream

(57) ABSTRACT

A tire changing kit includes a jack movable between lowered and raised configurations and an impact wrench. An electrical plug is configured for electrical communication with an automobile battery through an automobile outlet, the electrical plug being in electrical communication with the impact wrench for powering the impact wrench. The kit includes at least one socket configured to be rotated by the impact wrench for turning a lug nut. The impact wrench includes a processor, an electrical memory device in data communication with the processor, audio data relating to instructions for changing a tire, the audio data being stored in the memory device, a user input device in data communication with the processor, and programming in the processor actuate the jack and to cause the audio data to be provided to an audio speaker upon receiving certain audio instructions from the user input device.

15 Claims, 5 Drawing Sheets

TIRE CHANGING KIT

BACKGROUND OF THE INVENTION

This invention relates generally to tire changing devices and, more particularly, to a tire changing kit that simplifies the task of changing an automobile tire. The tire changing kit eliminates the cumbersome use of traditional tire changing equipment and makes changing a flat tire simple for all drivers.

The availability of roadside assistance, cell phones, and emergency satellite communication systems like OnStar® have given many motorists such peace of mind that they do not think of ever having to change a flat tire—until the time when the need actually arises. Many motorists actually have very little knowledge of how to operate items such as the scissor jack and lug wrench that come with every new vehicle. Other motorists, particularly women and the elderly, do not possess the physical strength to operate the jack to lift today's heavy automobiles such as SUV'S.

Various devices have been proposed in the art for enhancing a motorist's ability to change a spare tire, such as the emergency kit proposed in U.S. Pat. No. 6,733,132 to Gilligan, et al. Gilligan teaches a case having an impact wrench, a jack, an air compressor, and hoses. Although assumably effective for its intended purposes, the Gilligan proposal and other existing devices do not provide a simple to use system having all controls, including a light, centrally accessible on the impact wrench for use while actually changing a tire. Further, the existing devices and proposals do not assist a motorist who may be unfamiliar with the mechanical devices and procedures for changing a tire.

Therefore, it would be desirable to have a tire changing kit that overcomes the drawbacks and limitations of the existing proposals and devices.

SUMMARY OF THE INVENTION

A tire changing kit according to the present invention includes a jack movable between lowered and raised configurations and an impact wrench. An electrical plug is configured for electrical communication with an automobile battery through an automobile outlet, the electrical plug being in electrical communication with the impact wrench for powering the impact wrench. The kit includes at least one socket configured to be rotated by the impact wrench for turning a lug nut. The impact wrench includes a processor, an electrical memory device in data communication with the processor, audio data relating to instructions for changing a tire, the audio data being stored in the memory device, a user input device in data communication with the processor, and programming in the processor to cause the audio data to be provided to an audio speaker upon receiving certain audio instructions from the user input device. The impact wrench includes controls and the processor includes programming to actuate the jack to move between lowered and raised configurations.

Therefore, a general object of this invention is to provide a tire changing kit for simplifying the process of changing an automobile tire.

Another object of this invention is to provide a tire changing kit, as aforesaid, that provides an impact wrench and jack that may be powered by a vehicle's battery.

Still another object of this invention is to provide a tire changing kit, as aforesaid, that places all user controls on the impact wrench for operative use by a single motorist while changing a tire.

Yet another object of this invention is to provide a tire changing kit, as aforesaid, in which the impact wrench includes a processor having programming for actuating the jack.

A further object of this invention is to provide a tire changing kit, as aforesaid, in which the impact wrench includes audio instructions regarding procedures for changing a tire, the processor including programming for providing the audio instructions to an automobile speaker for audible transmission during a tire changing event.

A still further object of this invention is to provide a tire changing kit, as aforesaid, in which the impact wrench includes a light that may be directed by the motorist without interrupting the tire changing process.

A particular object of this invention is to provide a tire changing kit, as aforesaid, in which the impact wrench includes a voltage monitoring device for indicating if the voltage of the vehicle's battery is low.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is an isolated view on an enlarged scale taken from a portion of FIG. 2a;

FIG. 3 is a perspective view taken from another angle of the impact wrench as in FIG. 2a;

DESCRIPTION OF THE PREFERRED EMBODIMENT

A kit for changing a tire will now be described in detail with reference to FIG. 1 through FIG. 5 of the accompanying drawings. More particularly, a kit 100 for changing a tire includes an impact wrench 110.

Figure 2A:
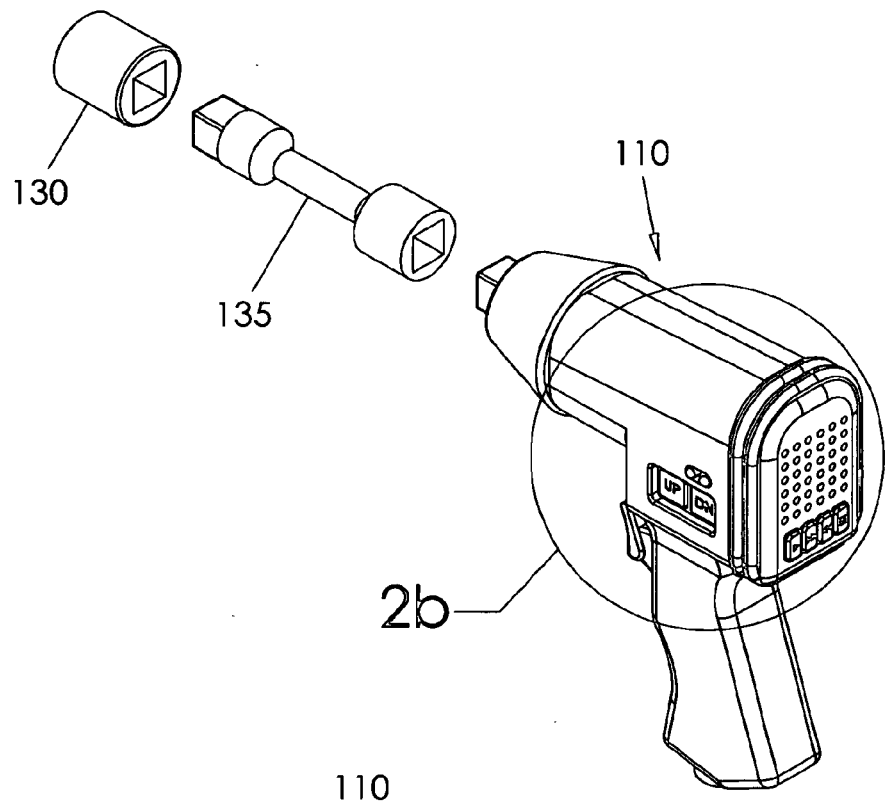
FIG. 2a is an perspective view of an impact wrench removed from FIG. 1.
Figure 2B:
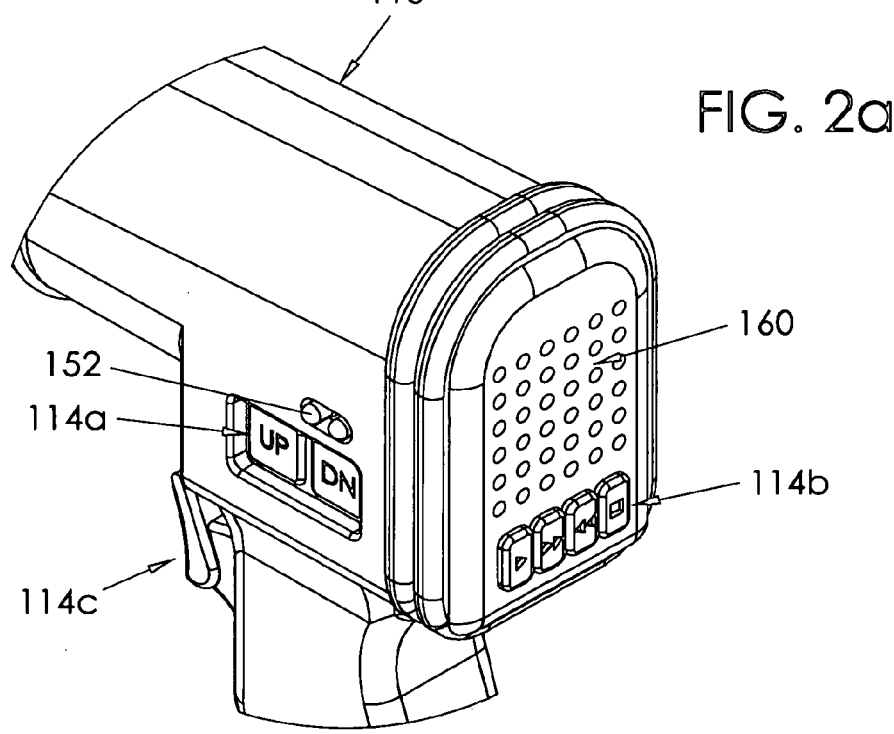
Figure 3:
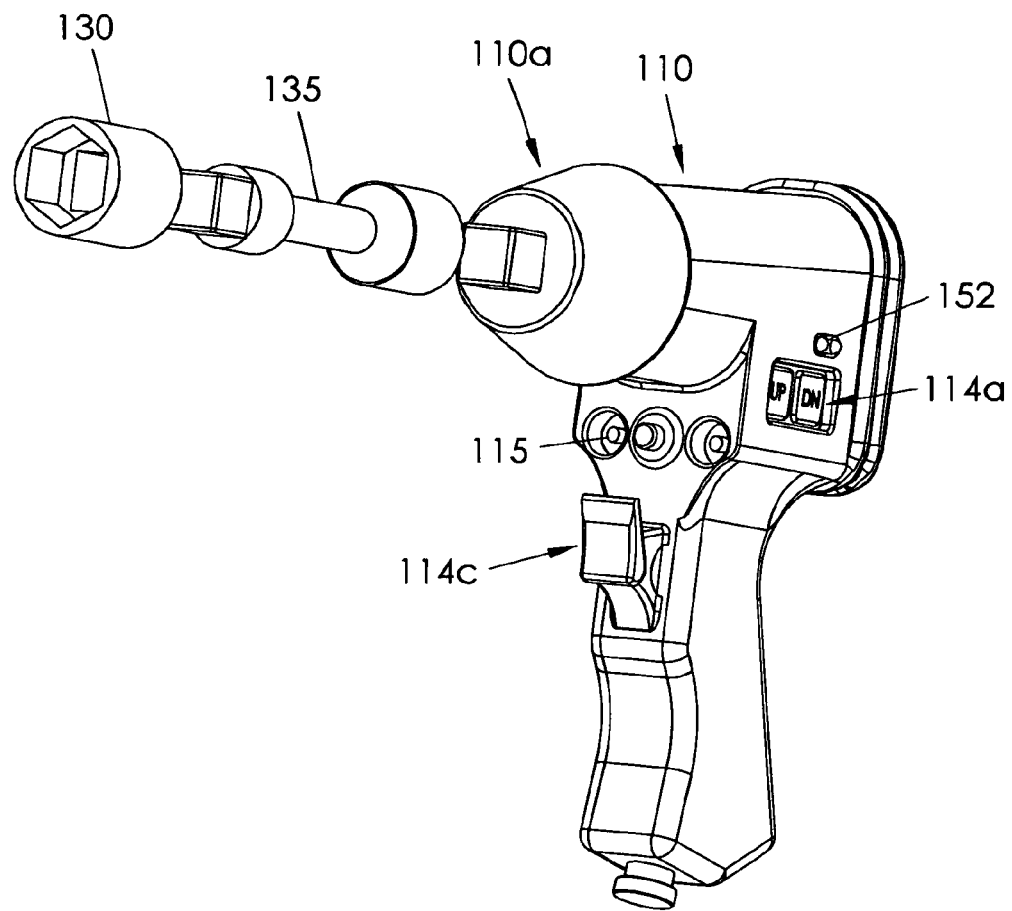
Figure 4:
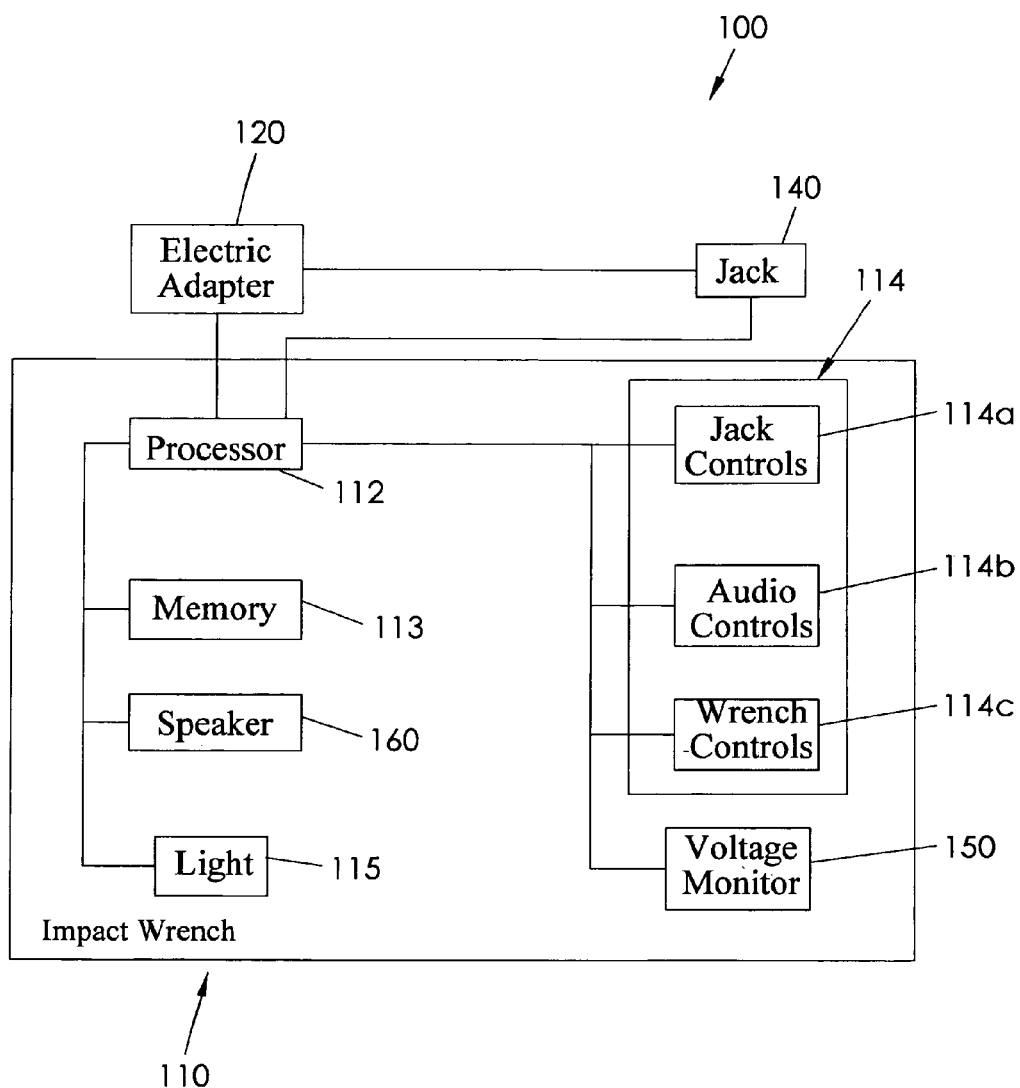
FIG. 4 is a block diagram of the components of the tire changing kit as in FIG. 1.

As shown in FIG. 4, the impact wrench 110 includes a processor 112, an electrical memory device 113 in data communication with the processor 112, a user input device 114 in data communication with the processor 112, and various programming. The user input device 114 may include a plurality of input elements (e.g., input elements 114a, 114b, 114c, . . . ) for providing various instructions to the processor 112 (FIG. 2b). A lighting device 115 (e.g., a LED, incandescent light bulb, etc.) may be coupled to the impact wrench 110 in a position that applies light at a forward end 110a of the impact wrench 110 when the lighting device 115 is activated (FIG. 3). It is understood that the position of the lighting device 115 enables the light to be directed by the user as needed or desired without having to pause the process of changing a tire in order to reposition an auxiliary light.

Figure 1:
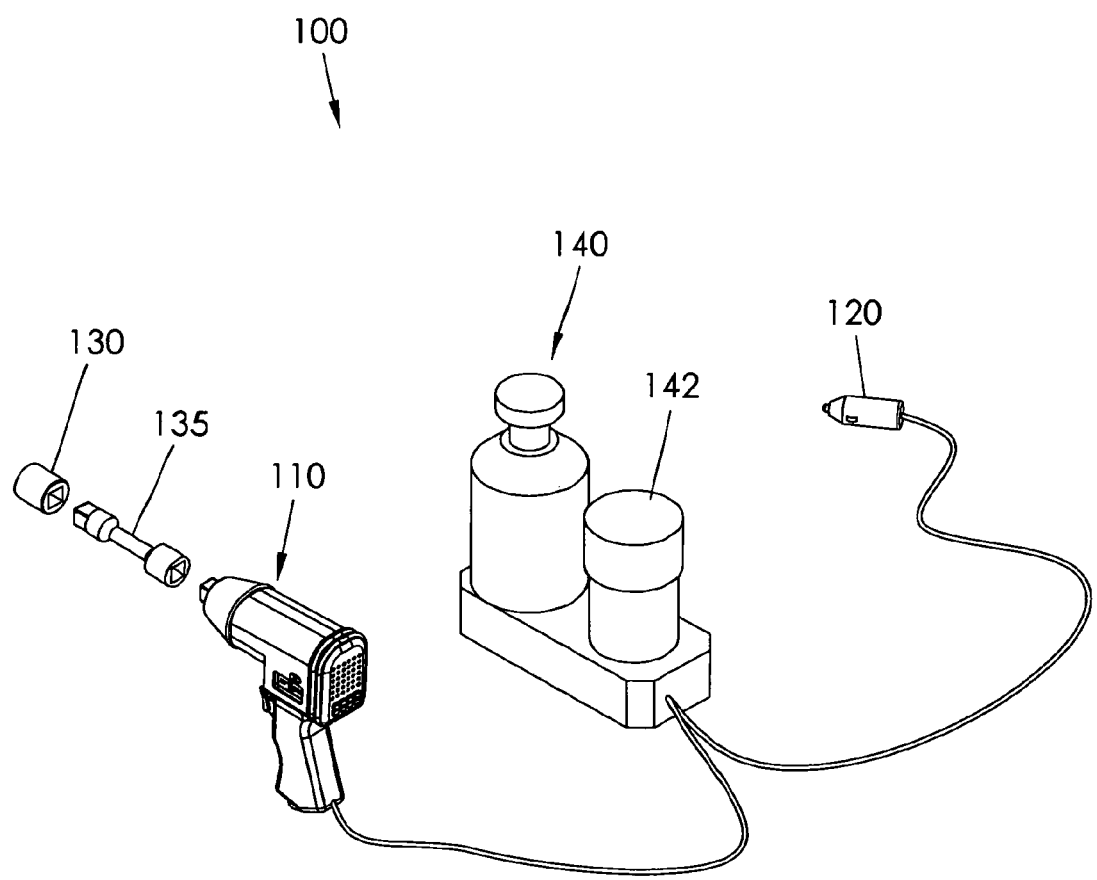
FIG. 1 is a perspective view of a tire changing kit according to a preferred embodiment of the present invention.

As shown in FIG. 1, an electrical plug 120 is configured for electrical communication with an automobile battery through an automobile outlet, e.g. a cigarette lighter, and the electrical plug 120 is in electrical communication with the impact wrench 110 for powering the impact wrench 110. At least one socket 130 is configured to be rotated by the impact wrench 110 for turning a lug nut, and a torque stick 135 may be included between the socket 130 and the impact wrench 110 to limit an amount of torque applied by the impact wrench 110 on the socket 130. The torque stick 135 is a socket extension that begins to twist and absorb the energy from the impact wrench 110 once the torque stick 135 reaches a predetermined torque setting.

The kit 100 may include a jack 140 that is movable between lowered and raised configurations and means for moving the jack 140 between the lowered and raised configurations. For example, as shown in FIG. 1, the jack 140 may have an actuating device 142 (e.g., an electric motor, hydraulic pump, air compressor, etc.) that is in electrical communication with the electrical plug 120 to move the jack 140 between the lowered and raised configurations using power from the automobile battery. Programming in the processor 112 may cause the actuating device 142 to move the jack 140 between the lowered and raised configurations upon receiving certain movement instructions from the user input device 114. Alternately, the means for moving the jack 140 may include a force transfer input mechanically coupled to the jack 140 and a force transfer bit complementary to the force transfer input that is configured to be rotated by the impact wrench 110. Rotation of the force transfer bit may cause the force transfer input to rotate and move the jack 140 between the lowered and raised configurations. The force transfer bit may be the same as the socket 130, or the force transfer bit may be separate from the socket 130. In other words, the impact wrench may be operatively connected directly to the jack, especially in the case of a scissor jack, to actuate it between raised and lowered configurations.

A voltage monitor 150 may be in electrical communication with the electrical plug 120 for monitoring voltage of the automobile battery powering the electrical plug 120. The voltage monitor 150 includes an indicator 152 (FIG. 2b) for indicating that the voltage of the automobile battery is low (i.e., below a predetermined threshold), and as shown in FIG. 2b, the impact wrench 110 may include the voltage monitor 150. Accordingly, a user may monitor and/or be alerted if the voltage of the automobile's battery is being depleted as a result of operation of the impact wrench, jack, and light. In such an instance, the user could move the jack to a safe configuration and run the vehicle's engine for a period of time to restore voltage to the battery.

Figure 5:
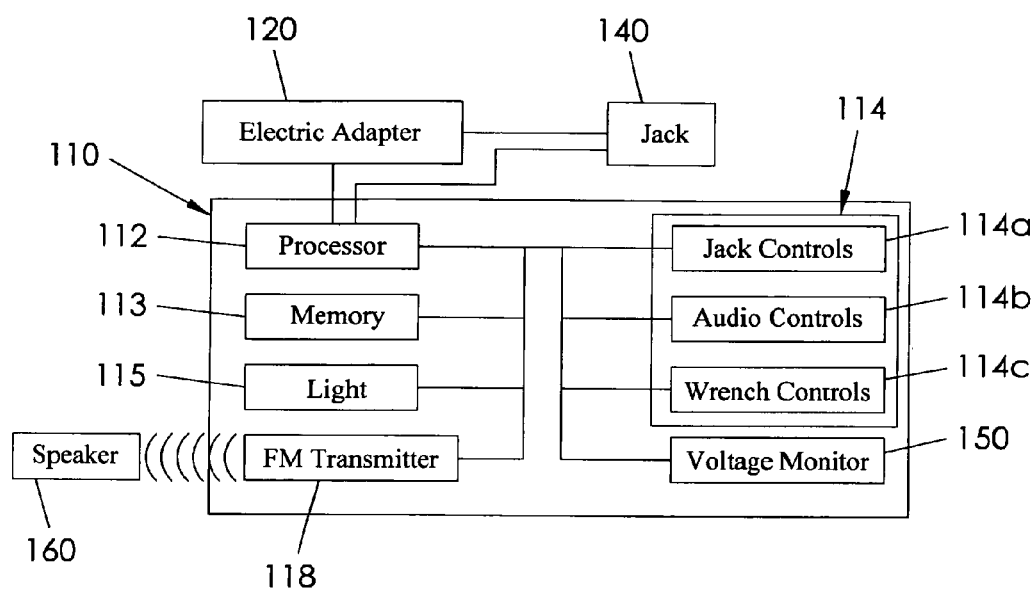
FIG. 5 is a block diagram of the components of a tire changing kit according to an alternative embodiment of the present invention.

The electrical memory device 113 may include audio data relating to instructions for changing a tire, and programming in the processor 112 may cause the audio data to be provided to an audio speaker 160 upon receiving certain audio instructions from the user input device 114. In one embodiment, as shown in FIG. 4, the speaker 160 may be coupled to the impact wrench 110. In another embodiment, as shown in FIG. 5, the speaker 160 may be an automobile speaker 160 and means may be included for transferring the audio data from the memory device 113 to the automobile speaker 160. For example, wiring may connect the memory device 113 to the automobile speaker 160 or a FM transmitter 118 (FIG. 5) may be in data communication with the processor 112 for transmitting the audio data to the automobile speaker 160. Accordingly, the user and perhaps a companion in the automobile may listen to the audio instructions as a tire changing event is undertaken.

In use, the kit 100 may be stored in an automobile trunk or another appropriate location. When needed, the kit 100 may then be accessed. The jack 140 may be placed beneath the automobile, the electrical plug 120 may be inserted in the automobile's electrical outlet, and the jack 140 may be moved from the lowered configuration to the raised configuration to lift the automobile off the ground. For example, the user may use the input device 114 to cause the processor 112 to activate the actuation device 142. The impact wrench 110 may be used (along with the socket 130) to remove the lug nuts from the tire being changed, and the lighting device 115 may be used to illuminate the lug nuts if ambient light is insufficient. The lighting device 115 may also be used to illuminate other particular locations as needed, such as the interior of the automobile, the interior of the trunk, or even under the vehicle if a lug nut was dropped or misplaced. After the tire is removed and replaced with another tire, the impact wrench 110 (in combination with the socket 130 and the torque stick 135) may be used to replace the lug nuts to secure the new tire. The torque stick 135 may function as set forth above to ensure that the lug nuts are not over-torqued. The jack 140 may then be returned to the lowered configuration. For example, the user may use the input device 114 to cause the processor 112 to activate the actuation device 142.

If the voltage of the automobile battery becomes low, the indicator 152 may show the user that the automobile's engine should be promptly started to recharge the battery or that use of the kit 100 should be stopped to ensure that the automobile can be started by the battery. Additionally, if the audio data is included in the electrical memory device 113, the user may use the input device 114 to cause the audio data to be provided to the speaker 160. The audio data may provide step-by-step instructions regarding how to change the tire, and the user may pause, rewind, or fast-forward the instructions using the input device 114. In some embodiments, the user may be required to use the input device 114 to move from one step to the next. In other embodiments, there may be automatic pauses between the steps to allow a user to complete the respective steps.

It is understood that while certain forms of this invention have been illustrated and described, it is not limited thereto except insofar as such limitations are included in the following claims and allowable functional equivalents thereof.

The invention claimed is:

1. A tire changing kit, comprising:
  a jack movable between lowered and raised configurations;
  an impact wrench;
  an electrical plug configured for electrical communication with an automobile battery through an automobile outlet, said electrical plug being in electrical communication with said impact wrench for powering said impact wrench;
  at least one socket configured to be rotated by said impact wrench for turning a lug nut; and
  means for moving said jack between said lowered and raised configurations;
  wherein said impact wrench includes:
    a processor;
    an electrical memory device in data communication with said processor;
    audio data relating to instructions for changing a tire, said audio data being stored in said memory device;
    a user input device in data communication with said processor; and
    programming in said processor to cause said audio data to be provided to an audio speaker upon receiving certain audio instructions from said user input device.

2. The kit of claim 1, wherein:
  said audio speaker is an automobile speaker; and
  means are included for transferring said audio data from said memory device to said automobile speaker.

3. The kit of claim 2, wherein said means for transferring include at least one of:
   (a) a FM transmitter in data communication with said processor; or
   (b) wiring between said memory device and said automobile speaker.

4. The kit of claim 3, further comprising a voltage monitor in electrical communication with said electrical plug for monitoring voltage of said automobile battery, said voltage monitor having an indicator for indicating a low voltage of said automobile battery.

5. The kit of claim 4, wherein:
   said impact wrench includes said voltage monitor; and
   said impact wrench includes a lighting device configured to apply light at a forward end of said impact wrench.

6. The kit of claim 5, wherein said means for moving said jack includes:
   one of an electric motor, a hydraulic pump, or an air compressor for utilizing power from said electrical plug to move said jack between said lowered and raised configurations; and
   programming in said processor to cause said electric motor, said hydraulic pump, or said air compressor to move said jack between said lowered and raised configurations upon receiving certain movement instructions from said user input device.

7. The kit of claim 5, wherein said means for moving said jack includes:
   a force transfer input coupled to said jack; and
   a force transfer bit complementary to said force transfer input and being configured to be rotated by said impact wrench for moving said jack between said lowered configuration and said raised configuration.

8. The kit of claim 5, further comprising a torque stick between said socket and said impact wrench to limit an amount of torque applied by said impact wrench on said socket.

9. The kit of claim 1, wherein said audio speaker is coupled to said impact wrench.

10. The kit of claim 1, wherein said user input device includes a plurality of input elements.

11. The kit of claim 1, wherein said means for moving said jack includes:
   one of an electric motor, a hydraulic pump, or an air compressor for utilizing power from said electrical plug to move said jack between said lowered and raised configurations; and
   programming in said processor to cause said electric motor, said hydraulic pump, or said air compressor to move said jack between said lowered and raised configurations upon receiving certain movement instructions from said user input device.

12. The kit of claim 1, further comprising a voltage monitor in electrical communication with said electrical plug for monitoring voltage of said automobile battery; and wherein:
   said voltage monitor has an indicator for indicating a low voltage of said automobile battery;
   said impact wrench includes said voltage monitor; and
   said impact wrench includes a lighting device configured to apply light at a forward end of said impact wrench.

13. A tire changing kit, comprising:
   a jack movable between lowered and raised configurations;
   an impact wrench;
   an electrical plug configured for electrical communication with an automobile battery through an automobile outlet, said electrical plug being in electrical communication with said impact wrench for powering said impact wrench;
   at least one socket configured to be rotated by said impact wrench for turning a lug nut; and
   one of an electric motor, a hydraulic pump, or an air compressor for utilizing power from said electrical plug to move said jack between said lowered and raised configurations;
   wherein said impact wrench includes:
     a processor;
     an electrical memory device in data communication with said processor;
     a user input device in data communication with said processor; and
     programming in said processor to cause said electric motor, said hydraulic pump, or said air compressor to move said jack between said lowered and raised configurations upon receiving certain movement instructions from said user input device.

14. The kit of claim 13, further comprising a voltage monitor in electrical communication with said electrical plug for monitoring voltage of said automobile battery, said voltage monitor having an indicator for indicating a low voltage of said automobile battery.

15. The kit of claim 14, wherein:
   said impact wrench includes said voltage monitor; and
   said impact wrench includes a lighting device configured to apply light at a forward end of said impact wrench.

* * * * *